(12) United States Patent
Barrett et al.

(10) Patent No.: US 8,914,460 B2
(45) Date of Patent: Dec. 16, 2014

(54) SYSTEM AND METHOD FOR EFFICIENT DELIVERY OF DATA CONTENT

(75) Inventors: Tim Barrett, Kanata (CA); Robert Haylock, Carnegie (AU)

(73) Assignee: Sound View Innovations, LLC, Parsippany, NJ (US)

( * ) Notice: Subject to any disclaimer, the term of this patent is extended or adjusted under 35 U.S.C. 154(b) by 2238 days.

(21) Appl. No.: 11/727,418

(22) Filed: Mar. 26, 2007

(65) Prior Publication Data
US 2008/0243924 A1 Oct. 2, 2008

(51) Int. Cl.
| | |
|---|---|
| *G06F 15/16* | (2006.01) |
| *H04N 7/173* | (2011.01) |
| *H04N 21/6405* | (2011.01) |
| *H04N 21/433* | (2011.01) |
| *H04N 21/442* | (2011.01) |
| *H04N 21/8355* | (2011.01) |
| *H04N 21/262* | (2011.01) |
| *H04N 21/472* | (2011.01) |
| *H04N 21/4147* | (2011.01) |
| *H04N 21/4627* | (2011.01) |

(52) U.S. Cl.
CPC ....... *H04N 7/17318* (2013.01); *H04N 21/6405* (2013.01); *H04N 21/4331* (2013.01); *H04N 21/44209* (2013.01); *H04N 21/8355* (2013.01); *H04N 21/262* (2013.01); *H04N 21/47202* (2013.01); *H04N 21/4147* (2013.01); *H04N 21/442* (2013.01); *H04N 21/4627* (2013.01)
USPC .............................. 709/217; 709/229; 725/87

(58) Field of Classification Search
USPC .............................. 709/217, 229, 231; 725/87
See application file for complete search history.

(56) References Cited

U.S. PATENT DOCUMENTS

| 5,956,716 A | * | 9/1999 | Kenner et al. .................... 707/10 |
| 6,018,359 A | * | 1/2000 | Kermode et al. ............. 725/101 |
| 2002/0002708 A1 | * | 1/2002 | Arye ............................... 725/95 |
| 2002/0147979 A1 | * | 10/2002 | Corson ........................... 725/90 |
| 2002/0165920 A1 | * | 11/2002 | Keller-Tuberg ............... 709/204 |
| 2003/0005457 A1 | * | 1/2003 | Faibish et al. ................... 725/94 |

(Continued)

FOREIGN PATENT DOCUMENTS

WO WO 2006-115697 11/2006

OTHER PUBLICATIONS http://en.wikipedia.org/w/index.php?title=Digital_video_recorder&oldid=116502386#Patent_litigation "Digital Video Recorder", Mar. 2007.

(Continued)

*Primary Examiner* — Karen Tang
*Assistant Examiner* — Sherman Lin
(74) *Attorney, Agent, or Firm* — Lerner, David, Littenberg, Krumholz & Mentlik, LLP

(57) ABSTRACT

A method of delivering video on demand content, including multicasting content to a plurality of client devices with storage, including instances where delivery begins mid-stream, and recovery mechanisms for missing content. Some embodiments include defining content as mandatory and involuntarily delivering the mandatory content. Some embodiments include a carousel with a plurality of data sets, delivering each of the data sets in sequence, and then beginning repeating delivery circularly from the beginning of the sequence. Various exemplary embodiments include one or more of the following: storing a title at each client device; repeating various steps for more multiple titles; and monitoring for a required action such as downloading a new title, deleting an old title, or changing the rate of data transfer, and performing the required action.

23 Claims, 7 Drawing Sheets

(56) References Cited

U.S. PATENT DOCUMENTS

| | | | |
|---|---|---|---|
| 2003/0040962 A1* | 2/2003 | Lewis | 705/14 |
| 2003/0066093 A1* | 4/2003 | Cruz-Rivera et al. | 725/146 |
| 2003/0105809 A1* | 6/2003 | Yoshii et al. | 709/203 |
| 2003/0121055 A1 | 6/2003 | Kaminski | |
| 2005/0114900 A1 | 5/2005 | Ladd et al. | |
| 2005/0216942 A1 | 9/2005 | Barton | |
| 2007/0009235 A1 | 1/2007 | Walters et al. | |

OTHER PUBLICATIONS http://en.wikipedia.org/w/index.php?title=Data_and_object_Carousel&oldid=105998083, "Date and object Carousel", Feb. 2007.

http://en.wikipedia.org/w/index.php?title=Switched_video&oldid=109976852, "Switched Digital Video", Feb. 2007.

http://www.motorola.com/mot/doc/6/6578_MotDoc.pdf, Using Bandwidth More Efficiently with Switched Digital Video, 2007, PA.

* cited by examiner

SYSTEM AND METHOD FOR EFFICIENT DELIVERY OF DATA CONTENT

BACKGROUND OF THE INVENTION

1. Field of the Invention

This invention relates generally to efficient delivery of information over networks to clients with storage, and in particular, mechanisms for the efficient delivery of Video on Demand (VoD) content.

2. Description of Related Art

Digital video recorders (DVRs) enable the scheduling of the recording of a video programming enabling users to view a program at the convenience of the viewer. Early consumer DVRs, were launched at the 1999 Consumer Electronics Show in Las Vegas. Since then, DVRs have steadily developed complementary abilities, such as recording onto DVDs, commercial skip, sharing of recordings over the Internet, and programming and remote control facilities using PDAs, networked PCs, or Web browsers.

A DVR is different from traditional video on demand as according to traditional video on demand, a user is able to instantaneously watch a program from among a wide selection of programming content, and to have the program delivered in real time across a network. Some technologies deliver broadcast content ahead of time to client devices that have storage, and then provide a user interface to allow the stored content to be watched at the convenience of the user or "on demand."

Video on demand (VOD) systems allow users to select and watch video content over a network as part of an interactive television system. VOD systems either "stream" content, allowing viewing in real time, or download content whereby a program is brought either in part or in its entirety to a set-top box before viewing starts. The majority of VOD systems using cable television or telephone company infrastructure also use the streaming approach for VOD. In the streaming approach to VOD, a user buys or selects a movie or television program and it begins to play on the television set almost instantaneously.

In addition to VOD technology and systems, many satellite and cable companies are incorporating DVR functions into their set-top box. Likewise, television manufacturers are beginning to offer televisions with DVR functions built in. The phrase "digital video recorder (DVR)" is often used interchangeably with the phrase "personal video recorder (PVR)" to denote a device that records video without videotape to a hard drive-based digital storage medium. This includes stand-alone set-top boxes and software for personal computers which enables video capture and playback to and from disk. This technology has also become the main way for CCTV companies to record their surveillance, because DVRs provide far longer recording times than the old VCRs.

In terms of personal video recorders (PVRs), there is a range of products appearing around the world, particularly those that represent a merging of analogue and digital technologies. Companies such as Tivo offer PVRs with a large storage capacity. These boxes take digital or analogue video in, potentially encode it on the fly and, as mentioned above, are differentiated from a VCR because they store the video on a local hard disk.

Complete with an ethernet port, such boxes can download EPG (Electronic Program Guide) information and use it to allow users to schedule recording. Additionally, many companies now offer PVR capability in their satellite or cable receivers, and with the emergence of Internet Protocol Television (IPTV), video may be multicast and can be written directly to the hard drive of the PVR.

IPTV is a system where a digital television service is delivered using the Internet Protocol over a network infrastructure, which may include delivery by a broadband connection. For residential users, IPTV is often provided in conjunction with Video on Demand and may be bundled with Internet services. IPTV is typically supplied by a broadband operator using a closed network infrastructure. This closed network approach is in competition with the delivery of TV content over the public Internet. This type of delivery is widely called TV over Internet or Internet Television. In businesses, IPTV may be used to deliver television content over corporate LANs and business networks. Thus, IPTV refers to television content that, instead of being delivered through traditional formats and cabling, is received by the viewer through the technologies used for computer networks.

Several companies are also shipping PVRs and using satellite, cable or IP networks to distribute VoD content to these devices.

Regarding the foregoing, such systems and mechanisms for delivery of video content are limited with respect to the number of titles available, and techniques of delivering the content in a reliable fashion. Thus, there is a need for improving information delivery systems and methods.

Any of the foregoing objects and advantages are illustrative of those that can be achieved by various exemplary embodiments. They are not intended to be interpreted as required of all possible embodiments, and they are not intended to be exhaustive or limiting of the possible advantages which can be realized. Thus, these and other objects and advantages of various exemplary embodiments will be apparent from the description herein or can be learned from practicing various exemplary embodiments, both as embodied herein or as modified in view of any variation which may be apparent to those skilled in the art. Accordingly, the present invention resides in the novel methods, arrangements, combinations and improvements herein shown and described in various exemplary embodiments.

SUMMARY OF THE INVENTION

In light of the present need for a system and method for efficient delivery of data content, a brief summary of various exemplary embodiments is presented. Some simplifications and omission may be made in the following summary, which is intended to highlight and introduce some aspects of various exemplary embodiments, but not intended to limit the scope of the invention.

In some embodiments, the data content is video data content. Some video delivery systems require that content is delivered in real time either by way of a unicast or multicast manner. The term "unicast" refers to the sending of information packets to a single destination. The word "unicast" is derived from the word broadcast. Unicast is the extreme opposite of broadcasting. Multicasting refers to the sending of information to multiple destinations simultaneously. Thus, unlike unicasting, multicasting regains some of the efficiencies of broadcasting.

In applications where content is to be stored at a client device, it is believed that the rate at which the content can be distributed may be unrelated to the rate at which the data will eventually be consumed. Thus, in various exemplary embodiments, a mechanism is implemented that distributes content to clients with storage. In various exemplary embodiments, the content is distributed via multicast. In various exemplary embodiments, the content is used to augment a real time, on demand, video service.

Thus, in various exemplary embodiments, the load on a network for real time information such as video on demand is minimized. Likewise, in various exemplary embodiments, a load on a server for that would otherwise be delivering real time information such as video on demand is minimized. It is believed that the point to point nature of video on demand or other real time information delivery services places a large strain on a network. It is correspondingly believed that there are serious cost implications in delivering such services in a scaled manner via an IP network. It is believed that there are likely to be an extremely high density of set top boxes or other devices with built in storage, or homes with said devices. Such implementations typically include multicast capability. In the case of Video Delivery, it is believed that the top twenty video on demand titles typically account for over ninety percent of consumer demand for video on demand services at any given point in time. Thus, it is believed that substantial savings can be realized on network and server infrastructure cost.

Nevertheless, it should be noted that various benefits of the subject matter described herein are achieved in systems where a small number of titles account for a large amount of consumer demand. The specific number of titles to which the subject matter described herein is applied varies from one embodiment to another.

Various exemplary embodiments will be described in connection with a multicast video on demand (MVOD) system.

BRIEF DESCRIPTION OF THE DRAWINGS

In order to better understand various exemplary embodiments, reference is made to the accompanying drawings, wherein.

DETAILED DESCRIPTION OF THE PREFERRED EMBODIMENTS OF THE INVENTION

Figure 1:
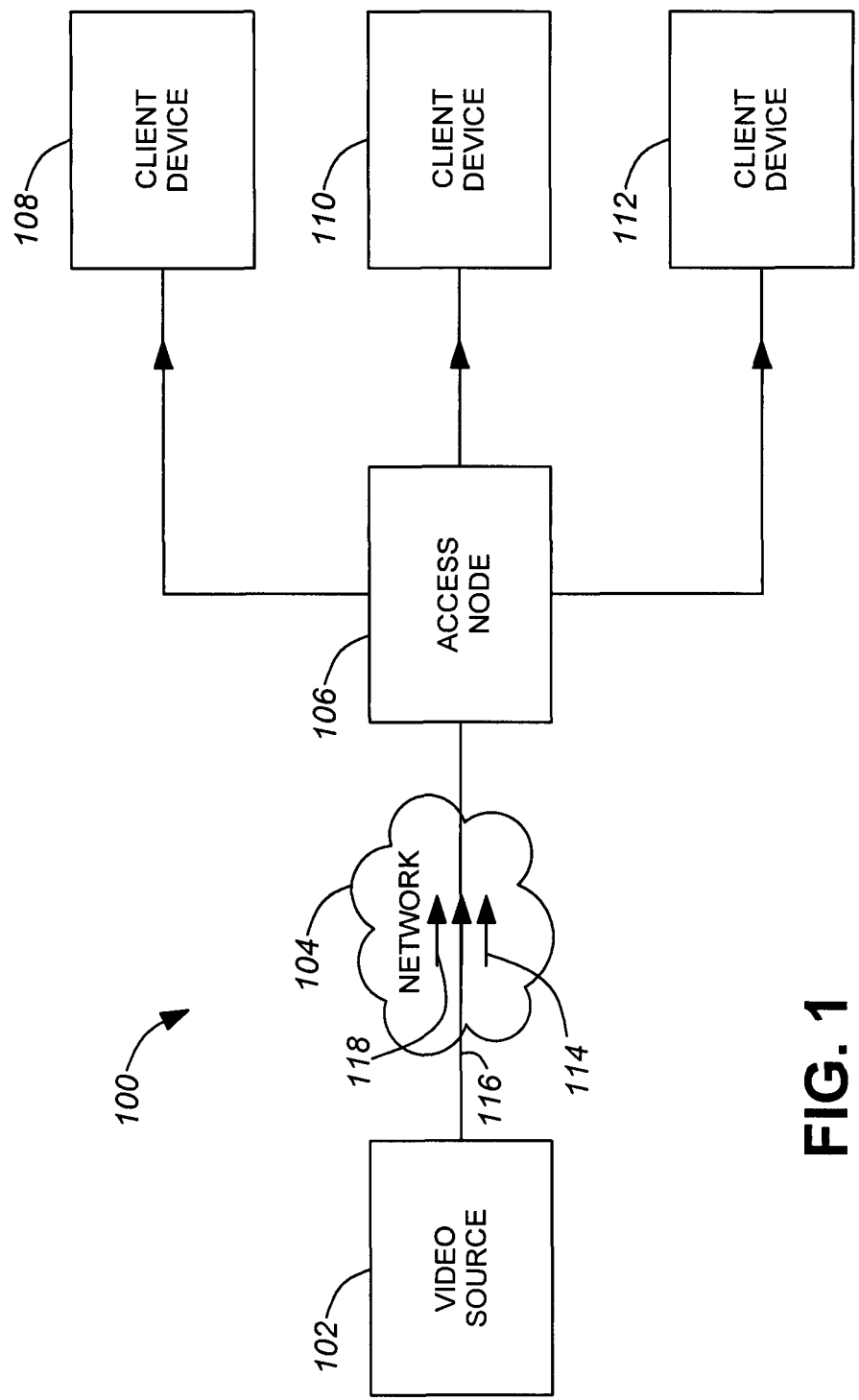
FIG. 1 is a schematic diagram of a first exemplary embodiment of a video on demand delivery system.

Referring now to the drawings, in which like numerals refer to like components or steps, there are disclosed broad aspects of various exemplary embodiments. It should be apparent that various aspects disclosed in various figures can be combined such that various exemplary embodiments include aspects depicted in more than one of FIGS. 1-7.

MVOD is an abbreviation of "Multicast Video On Demand" and is a concept whereby content is multicast in a non-real time fashion across a network to a PC, set top box or other device with storage.

In various exemplary embodiments, once the content is available on the device, a user is notified of its availability and, upon request, the content is played from the device just as if it were a network based video on demand service.

In various exemplary embodiments, the MVOD application is made up of a client and server application. The server application creates stream definitions then distributes this information (and all data associated with this stream definition) via non-real time multicast to the client. In one exemplary embodiment, the system is capable of reliably replicating a full directory hierarchy of information from a system in the network to many clients simultaneously.

While some embodiments are focused on delivery of video, other embodiments are used for any sort of data, including music, images or bulk file distribution.

In the case of video, in various exemplary embodiments, content is typically delivered to the clients in an encrypted form using a digital rights/conditional access. In various exemplary embodiments, when the user plays the content, the client connects to the network, gets a decrypt key, bills the customer and plays the content.

When configuring a stream definition, various exemplary embodiments specify a release date when the file will become available to the user. This field does not affect the scheduling of content. Rather, the time the stream is transmitted is based on the schedule information. However, if the content arrives on an MVOD Client device before its specified release date, the client application will not display the content as "Available" until the release date has past. In the interim, the content will be listed in the client's "Coming Soon" page.

The foregoing feature is useful for maintaining one common release date across all clients, while giving each client multiple opportunities to receive the content completely intact and error free. Thus, in various exemplary embodiments, the MVOD client application continues to listen for streams if it has only partially received that particular stream before. This improves error correction possibilities on lossy networks. By definition, lossy networks are networks that suffers data losses resulting in transmission errors.

In various exemplary embodiments that specify an expiry date, the date does not affect the transmission of content by the server. In various exemplary embodiments, specifying an expiry date has one or more of the following effects at the client end.

In some embodiments, the MVOD client regularly checks to see if any expired content is currently in storage. Within a pre-defined period after the specified expiry date of a channel, the channel is automatically physically removed from the client device. In various exemplary embodiments, this feature is used to ensure room is made on the client's disk drive for the following week's drama series episode by deleting the previous week's episode, for example. It should be apparent that, further to this example, other criteria are employed in other examples to determine content to physically remove from the client device.

In various exemplary embodiments, a server sends messages to all clients forcing them to delete content from the client devices.

In various exemplary embodiments, it is not necessary to send a stream by adding it to the schedule, a stream can be sent at any time as long as its group address is not already in use by another stream. In various exemplary embodiments, the MVOD server includes a feature that enables keeping track of streams and building a transmission history. In various exemplary embodiments, the information provided is used to manage the remote erasure of content from client devices. In various exemplary embodiments, this information is automatically recorded and updated by the server. No user intervention is required. It should be apparent that, in other embodiments, the information is recorded and updated in response to a corresponding prompt from a user or system operator. In still other embodiments, both options are implemented in the system.

In various exemplary embodiments, MVOD frees up significant bandwidth in the network by ensuring that the vast majority of the load that would be required by a traditional VoD service is covered instead by a single, low data rate multicast stream. In various exemplary embodiments, this then frees up some capacity that means additional bandwidth is available for a traditional video on demand service for content that is less popular.

In various exemplary embodiments, using MVOD, it is possible to deliver a service to customers whereby they are guaranteed to have the top 20 movies available to them "on demand" at any time. As previously mentioned, the number of on demand titles available on demand varies from one embodiment to another, and is determined based on a variety of criteria. In various exemplary embodiments, to deliver such a service with MVOD, a new movie is delivered to clients every day or so. In various exemplary embodiments, this makes it possible to completely update the contents of all client PVRs every month. In various exemplary embodiments, the older content is replaced with new content. Thus, users, at any point in time, are able to select, for example, any one of the top 20 movies.

To deliver this service as a traditional Video on Demand service, for example with DVD quality MPEG-2, is believed to require about 5 Mbit/s of bandwidth on the across the network per user. By contrast, to deliver the service via MVOD would require, for example, a single 100 kbit/s stream to constantly refresh the content on all users boxes. Thus, in various exemplary embodiments, all 1000 users can watch top 20 movies simultaneously with no impact on the network. Naturally, this concept is applied to other numbers of users and titles in various embodiments. Sometimes, the content is stored on client boxes in a protected form and when the user plays the movie, a request is sent off the network for a decrypt key to allow the content to be played. In various exemplary embodiments, at the same time, the customer is billed. In various exemplary embodiments, the billing model is flexible to allow the content to be playable for 24 hours, single play, and so on, depending on the digital rights management scheme used.

In various exemplary embodiments, all users get content delivered to them whether they watch it or not. In various exemplary embodiments, there is a category of content that is reasonably popular, though not popular enough to clog up all user's hard disks, and therefore will still be multicast, but must be specifically subscribed to by the clients in order to receive it. In various exemplary embodiments, this content falls into the category of popular movies, niche content, serials, news, and so on.

In various exemplary embodiments, for content that is less popular, though still has a broad audience, an option exists for customers to order particular content that will be multicast when there are a predetermined number of requests for that content. Thus, according to the foregoing, it should be apparent that, in some embodiments, a plurality of mechanisms for the delivery of data exist and operate in parallel on a single system.

In various exemplary embodiments, for other content that is available, the significant reduction in network and access load allows for the delivery of unicast content streamed directly to the specific customer. In various exemplary embodiments, this is transmitted at a reduced data rate. In other embodiments, the content on the client hard drive may be used specifically to augment a real time stream.

Various exemplary embodiments include one or more of the following features: in-built multicast engine allowing the non-real time multicast of multiple video streams at once (client can also receive multiple streams at once); dynamically configurable data rate for each stream; configurable error correction; scheduling scheme for content delivery; capability of replicating directory hierarchies from server to client; dynamic detection of perfect transmission to ensure that files only appear when they are completely error free; capability to recover lost packets by receiving the file multiple times; mandatory content delivered to the user whether they subscribe to it or not (e.g. top 20 movies); non-mandatory content in a second tier of service for material that is not so popular or labeled as premium; error correction scheme; robust file information distribution; capacity to have the server and server user interface run on different machines; dynamically updated content availability on the client; and an interface to subscribe and unsubscribe from non-mandatory content.

In various exemplary embodiments, the MVOD service works on the basis of having a multicast enabled network that is capable of delivering a number of multicast channels simultaneously. In various exemplary embodiments, the MVOD server broadcasts out a "heartbeat" every n seconds on a known information channel and information on this channel is received by all clients. In various exemplary embodiments, the heartbeat keeps the channel alive and allows the clients to know that the server is active.

In various exemplary embodiments, when the server is instructed to deliver content (either manually or through a scheduled content delivery event), several messages are multicast out to all clients on the information channel letting them know that the new channel is about to be sent. In various exemplary embodiments, the message is sent several times to protect against packet loss.

In various exemplary embodiments, the information that is sent to the client includes the multicast group and port address that the stream will appear on and a flag to indicate if the content is mandatory of not (i.e. whether the client has a choice in receiving it or not). In various exemplary embodiments, when the content is mandatory or the user has subscribed to a non-mandatory channel, the client will wait a random amount of time then start a listener on the specified multicast channel. In some such embodiments, the client waits a random amount of time to prevent an overload on the network of multiple clients simultaneously sending Internet Group Management Protocol (IGMP) join requests.

IGMP is a communications protocol used to manage the membership of Internet Protocol multicast groups. IGMP is used by IP hosts and adjacent multicast routers to establish multicast group memberships. It is an integral part of the IP multicast specification, analogous to Internet Control Message Protocol (ICMP) for unicast transmissions. IGMP is used for online video and gaming, for example, and allows more efficient use of resources when supporting these uses. However, a network can experience an overload condition when multiple clients on the network simultaneously send IGMP join requests. This possibility is believed to be dramatically reduced in embodiments where the client waits a random amount of time before sending IGMP join requests.

In various exemplary embodiments, the server begins broadcasting a countdown on the new stream's multicast address and port. In various exemplary embodiments, during this countdown period, information about the files that will be sent and the size of each of these files is sent multiple times. In various exemplary embodiments, by the time the countdown has ended and the stream is sent, all the clients have joined the multicast group, received all the file information and are ready to receive the incoming stream.

In various exemplary embodiments, the server sends all the files in the directory structure defined a certain way as a continuous stream of numbered User Datagram Protocol (UDP) packets. The UDP is one of the core protocols of the Internet protocol suite. Using UDP, programs on networked computers can send short messages sometimes known as datagrams (using Datagram Sockets) to one another. UDP is sometimes called the Universal Datagram Protocol or Unreliable Datagram Protocol because UDP does not provide the reliability and guaranteed ordering that TCP does. When using UDP, datagrams may arrive out of order, appear duplicated, or go missing without notice.

However, without the overhead of checking whether every packet actually arrived, UDP is faster and more efficient for many lightweight or time-sensitive purposes. Also, the stateless nature of UDP is useful for servers that answer small queries from huge numbers of clients. For these reasons, as compared to TCP, UDP is required for broadcast (send to all on local network) and multicast (send to all subscribers).

In various exemplary embodiments, a header may be appended to every packet to number it and identify it as being either a "Message," "File," "Forward Error Correction" or other type of packet. In various exemplary embodiments, as the stream is being sent, the server is constantly generating FEC (Forward Error Correction) data. In various exemplary embodiments, this is interspersed with the data packets adding a small amount to the overall data being sent.

In various exemplary embodiments, the actual amount of overhead and the robustness of the error correction capabilities are configurable, though the default options add about 10% to the amount of data that must be sent and will result in a guaranteed error free transmission of an average sized movie to all clients on a network with a random packet loss rate of just under 4%. It should be apparent that, in other embodiments, the addition to the amount of data that must be sent is a value other than 10%. Likewise, it should be apparent that, in other embodiments, the reduction in the random packet loss rate is a value other than just under 4%. Similarly, in still other embodiments, both values are different.

In various exemplary embodiments, when the client has received the file(s) from the server and they are all error free, a user interface is built dynamically and updated showing all the available content. In various exemplary embodiments, if the client detected errors in receiving the file, then the next time this content is sent from the server, the client receives the packets that it lost in order to completely reconstruct the information. In various exemplary embodiments, the client ensures that it has enough disk space to store the incoming streams and automatically deletes old content if necessary to make room.

Various exemplary embodiments include one or more of the following features: client, server, server user interface.

In various exemplary embodiments, the MVOD Client includes an application which receives multicast content from the server and provides an interactive user interface. In various exemplary embodiments, this enables navigation and playback of content as well as the ability to subscribe to new content.

In various exemplary embodiments, the client supports multiple user devices, meaning it is possible to run only one instance of the client within a home network environment, and access its available content via a web browser or other mechanism from any other machines on the home network. In various exemplary embodiments, settings are saved individually for each client device. In various exemplary embodiments, the web application is an alternative server user interface as described above. In various exemplary embodiments, the applet version of the server user interface communicates to the server through JSPs (java server pages) running on the app server. An applet is a program written in the Java programming language that can be included in an HTML page. JavaServer Pages (JSP) technology provides a simplified, fast way to create dynamic web content. JSP technology enables rapid development of web-based applications that are server- and platform-independent. In other exemplary embodiments, this interface may be provided though Web Services or some other mechanism.

In various exemplary embodiments, forward error correction allows recovery of data lost during transmission at the client end using protection provided by a small amount of additional transmitted data. In various exemplary embodiments, the method of forward error correction (FEC) used by MVOD is designed for use in a multicast IP environment, using UDP packets. In various exemplary embodiments, UDP packets are verified at the transport layer using a simple checksum. A checksum is a type of redundancy check. It is a simple way to protect the integrity of data by detecting errors in transmitted data. Thus, in various exemplary embodiments, packets with errors never reach the application layer. In various exemplary embodiments, the MVOD FEC mechanism operates at the application layer and is designed to reconstruct entire packets lost during transmission of a multicast stream.

In various exemplary embodiments, during packet recovery, a certain FEC packet is used along with all the correctly received data packets within its scope (and any FEC packets within it) to recover any single packet that may be missing within that scope. In various exemplary embodiments, FEC packets are used to recover other FEC packets. In various exemplary embodiments, this results in recovery of an FEC packet that is used to fix another lost data or FEC packet. In various exemplary embodiments, this occurs in a recursive fashion in an attempt to recover as many lost data packets as possible.

Various exemplary embodiments include unified packet identification and numbering scheme. In various exemplary embodiments, the FEC is designed for multicast UDP packets. Thus, in various exemplary embodiments, this information is inserted and interpreted at the application layer. In various exemplary embodiments, the packet sequence numbers extend uniquely across the entire FEC stream/session.

In various exemplary embodiments, the MVOD application is geared to transmitting multiple files error free on an unreliable network without any re-transmission. In the case of MPEG-2 Transport streams or similar video schemes designed to cope with loss, the technology may easily be adapted to substantially reduce the amount of errors received, as distinguished from embodiments that remove all errors.

In various exemplary embodiments, the act of a subscriber watching a movie is used to assist in setting automated profiles to determine which content gets downloaded to their PVR. In various exemplary embodiments, the user defines their own profile and/or pre-orders specific content.

In various exemplary embodiments where the content for an MVOD service is multicast, the service is scalable and bandwidth requirements are linked to the amount of content rather than the number of users. Unlike broadcast traffic, however, in various exemplary embodiments, MVOD is broadcast in non real time. Thus, in various exemplary embodiments, 5 Mbit/s content is delivered down a 1 Mbit pipe, simply taking 5 times longer to get to the user than it would if it were streamed real time. It should be apparent that other embodiments use other data transfer rates and/or other data transmission pipe sizes. In various exemplary embodiments, this allows for very high quality content to be delivered at low data rates.

It has been suggested that in the U.S., the top 12 titles in video stores account for 80% of demand. In various exemplary embodiments where MVOD is used to distribute these 12 titles and keep them up to date, a new movie only needs to be delivered to the set top at worst every few days. In various exemplary embodiments where there is a constant multicast stream in the network, this allows titles of DVD quality to be continually refreshed using a total network multicast bandwidth of 140 kbit/s. In various exemplary embodiments, hundreds of simultaneous multicast titles are broadcast in the same bandwidth as is required by an ordinary broadcast service. Again, it should be apparent that other embodiments use other numbers of titles and/or other total network multicast bandwidths.

Unlike a traditional VoD or Broadcast service, in various exemplary embodiments, network usage of an MVOD service is at the carrier's discretion and rates are increased or decreased during the day according to the bandwidth that is available at the time. Various exemplary embodiments implement a sufficiently light weight service to use existing free network capacity (e.g. keep top 12 movies up to date).

In various exemplary embodiments, from a carrier's perspective, the non-real time nature of MVOD makes it possible to deliver content or sell "capacity" as "multicast windows" to content owners. In various exemplary embodiments, as content is multicast non-real time, a pipe constantly downloads to refresh the locally stored content.

In various exemplary embodiments, having an MVOD infrastructure in place provides the ability to deliver a range of other different sorts of services such as one or more of the following: video on order (hours, days or weeks ahead); mass distribution and delivery of special events; and distribution of popular news, television series, and so on.

It is believed to be desirable when providing an MVOD service that the network infrastructure on which it is being delivered is multicast capable from end to end.

The foregoing will now be described with specific reference to the figures. It should be apparent that various aspects of the various exemplary embodiments described herein are combined according to a multitude of combinations in various exemplary embodiments.

FIG. 1 is a schematic diagram of a first exemplary embodiment of a video on demand delivery system 100. The exemplary video on demand delivery system 100 includes a video source 102, a network 104, an access node 106, and client devices 108, 110, 112. In VoD delivery system 100, video data is individually delivered to each client device 108, 110, 112 from video source 102 by way of network 104 and access node 106.

In various exemplary embodiments, a separate copy of data is sent to each client 108, 110, 112 by way of the network 104. In various exemplary embodiments, separate video streams 114, 116, 118 are delivered from a video server that is included in video source 102 to each client device 108, 110, 112, individually. It is believed that such embodiments require a substantial amount of bandwidth from the network 104.

Figure 2:
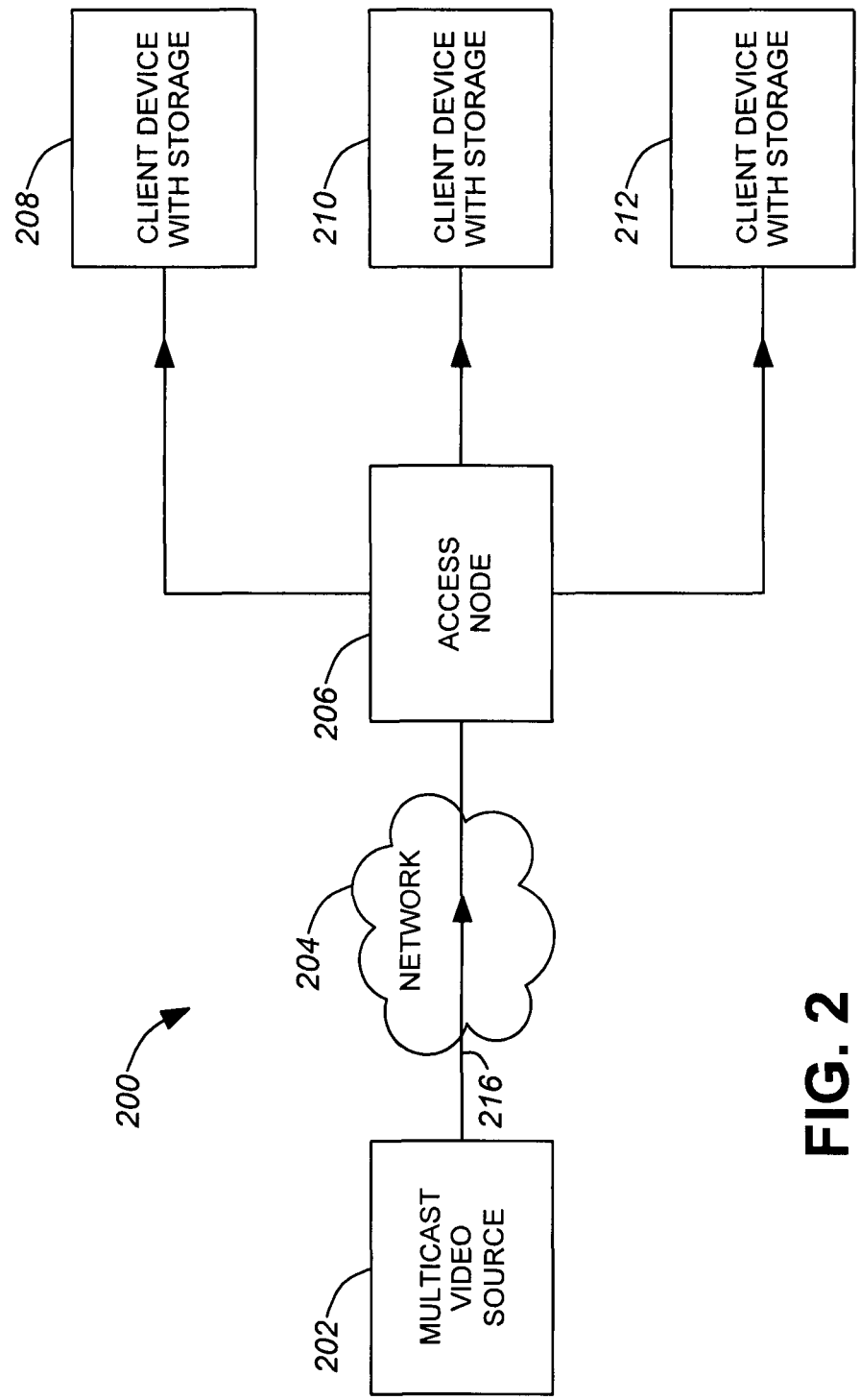
FIG. 2 is a schematic diagram of a second exemplary embodiment of a video on demand delivery system.

FIG. 2 is a schematic diagram of a second embodiment of a VoD delivery system 200. Exemplary VoD delivery system 200 includes a multicast video source 202, a network 204, an access node 206, and client devices with storage 208, 210, 212. Exemplary VoD delivery system 200 is a system wherein multicast content is delivered.

In various exemplary embodiments the same data is delivered to each client device with storage 208, 210, 212. In various exemplary embodiments, a single video stream 216 passes through the network 204. In various exemplary embodiments, the single video stream 216 is replicated at the access node 206 and subsequently delivered to each client device with storage 208, 210, 212.

In exemplary VoD delivery system 200, video is multicast out in non-real time. In various exemplary embodiments, only one copy of the video stream 216 is necessary within the network 204. In various exemplary embodiments, as depicted in FIG. 2, the client devices 208, 210, 212 include storage. It should be apparent that certain elements shown in FIG. 1 can be combined with elements shown in FIG. 2. Thus, in various exemplary embodiments, the client devices 108, 110, 112 are substituted for the client devices with storage 208, 210, 212.

In various exemplary embodiments including client devices with storage 208, 210, 212, when a video title is played at the client device 208, 210, 212, the video title is accessed from a local disk. In other exemplary embodiments where elements from FIG. 1 are combined with elements from FIG. 2, the video title is accessed via unicast from a video server such as the video source 102, across the network 204 when the video title is played. Thus, some embodiments correspond to FIG. 2 with the addition of video source 102, as shown in FIG. 1, as an alternative or supplement to multicast video source 202. The exemplary embodiment of VoD delivery system 200 typically reduces the bandwidth used in the network 204 as compared to the network 104.

Figure 3:
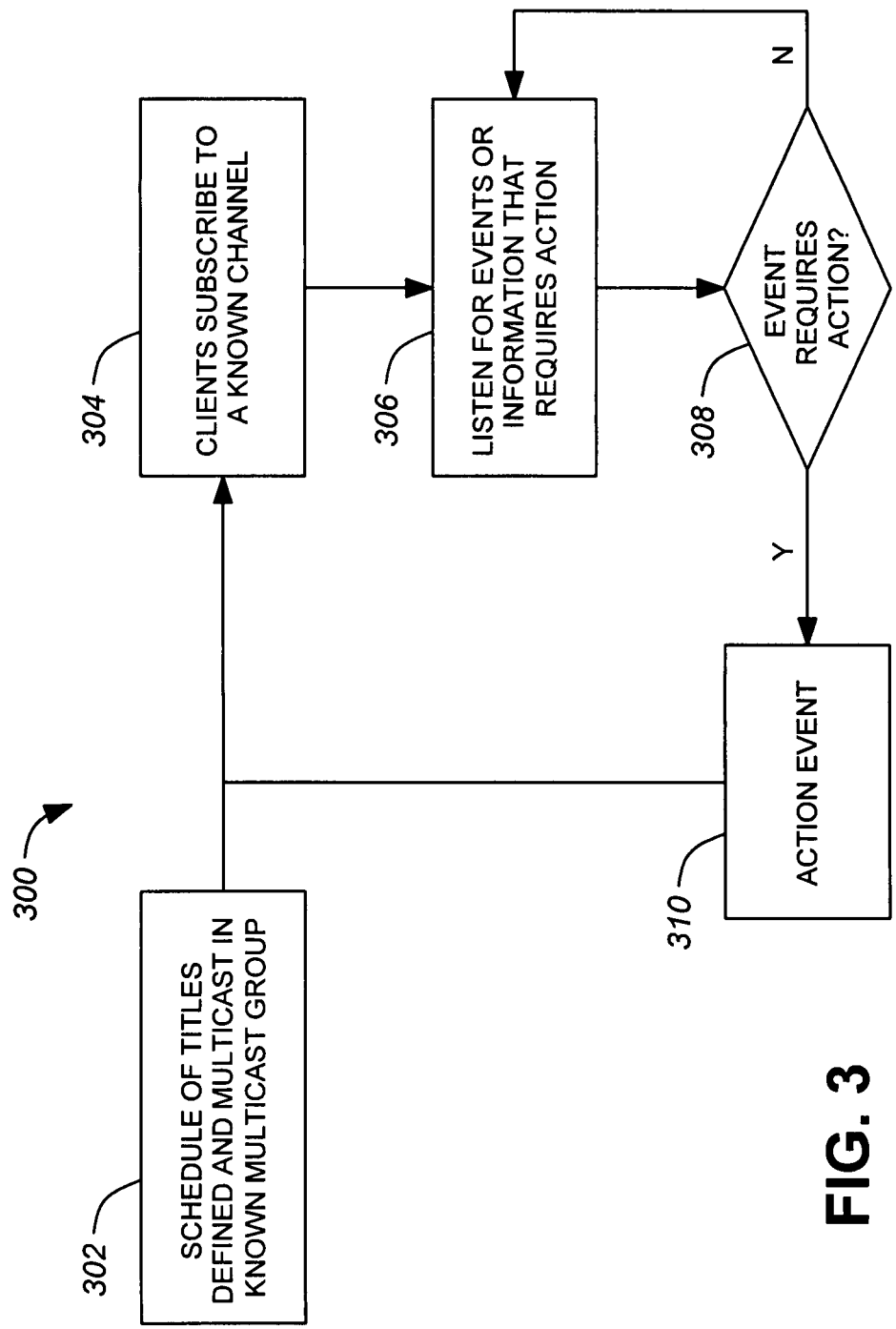
FIG. 3 is a schematic diagram of a first exemplary embodiment of a method of providing video on demand.

FIG. 3 is a schematic diagram of a first exemplary embodiment of a method of providing VoD 300. Beginning in step 302, a schedule of titles is defined and multicast in a known multicast group. Exemplary method 300 then passes to step 304. In exemplary step 304, clients subscribe to a known channel. Exemplary method 300 then passes to exemplary step 306.

In exemplary step 306, the client listens for events or information that require action. Exemplary method 300 then passes to step 308 where an evaluation is made whether an event exists that requires action. If a determination is made that no event exists that requires action in exemplary step 308, then exemplary method 300 returns to exemplary step 306 and exemplary step 306 is repeated.

If a determination is made in exemplary step 308 that an event exists that requires action, then exemplary method 300 passes to exemplary step 310. In exemplary step 310, the event requiring action takes place. Exemplary method 300 then returns to exemplary step 304.

In various exemplary embodiments, the multicast group in step 302 includes information for upcoming titles. In various exemplary embodiments, all of a plurality of clients subscribe to the multicast group in step 304. In various exemplary embodiments all of a plurality of clients listen to the multicast group in exemplary step 306. In various exemplary embodiments, all scheduling information is distributed on a channel assigned to a multicast group. According to the foregoing, FIG. 3 depicts an exemplary embodiment of a method for subscribing to multicast channels.

Figure 4:
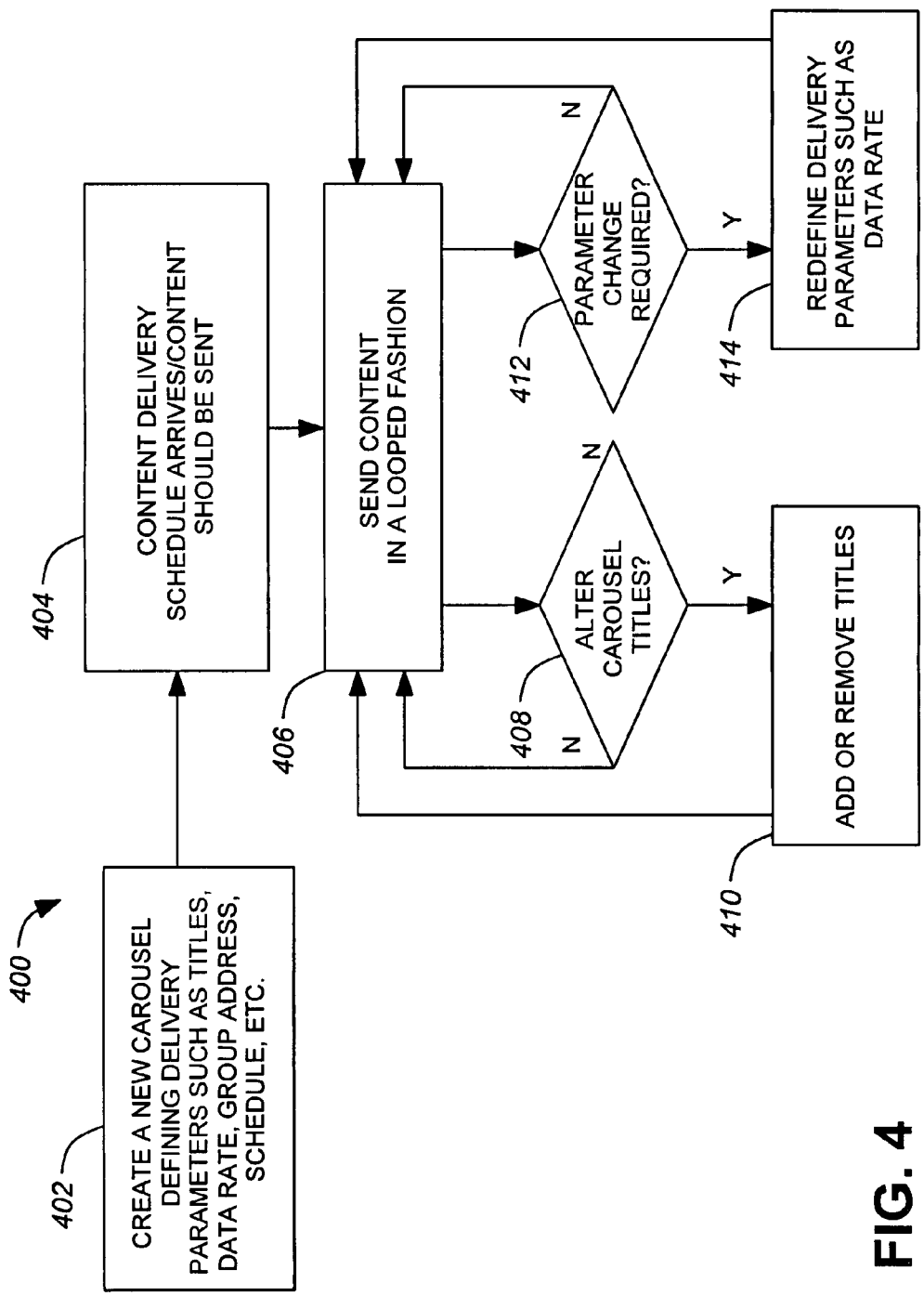
FIG. 4 is a schematic diagram of a second exemplary embodiment of a method of providing video on demand.

FIG. 4 is a schematic diagram of a second exemplary embodiment of a method of providing VoD 400. Exemplary method 400 begins in step 402 where a carousel defining delivery parameters is created. In various exemplary embodiments, the delivery parameters created in step 402 include one or more of specific content titles, data rate, group address, delivery schedule, metadata and so on. In various exemplary embodiments, the carousel is defined as one or more of the following: a number of titles to be played in a particular order;

a definition of a group that one or more titles belong to; a data rate at which to send one or more titles; a scheduled time to begin delivery of one or more titles; and so on.

Exemplary method 400 then proceeds to exemplary step 404. In exemplary step 404, a content delivery schedule arrives. When a determination is made according to the content delivery schedule that content should be sent, exemplary method 400 then precedes to exemplary step 406 where content is sent in a looped fashion.

In various exemplary embodiments, once content is being delivered, it is possible to add or remove titles from the list. In various exemplary embodiments, once the content is being delivered, it is possible to change the rate at which the content is being sent. In various exemplary embodiments, the rate at which content is being sent is changed manually. In various exemplary embodiments, the rate at which content is being sent is changed through one or more dynamic network feedback mechanisms.

In various exemplary embodiments, exemplary method 400 proceeds from exemplary step 406 to exemplary step 408. In exemplary step 408 an evaluation is performed whether to alter titles in the carousel. If a determination is made in exemplary step 408 not to alter titles in the carousel, the exemplary method 400 returns to exemplary step 406. If a determination method is made in exemplary step 408 to alter the titles in the carousel, exemplary method 400 proceeds to exemplary step 410 where titles are added or removed to the carousel. Following the exemplary step 410, exemplary method 400 returns to step 406.

In various exemplary embodiments, exemplary method 400 proceeds from exemplary step 406 to exemplary step 412. In exemplary step 412, an evaluation is performed whether a parameter is to be changed. If the results of the evaluation performed in exemplary step 412 is that no parameter is to be changed, exemplary method 400 returns to exemplary step 406. If the result of the evaluation in exemplary step 412 is that a parameter change is to occur, exemplary method 400 proceeds to exemplary step 414 where a delivery parameter is redefined.

In various exemplary embodiments, the delivery parameter redefined in exemplary step 414 is the rate at which the data is transferred. Following the redefinition of the delivery parameter in exemplary step 414 exemplary method 400 returns to exemplary 406.

Accordingly, the exemplary method of providing VoD 400 includes two loops from exemplary step 406. The first loop passes through step 408 and step 410 back to step 406. The second loop passes through step 412 and step 414 back to step 406. In various exemplary embodiments, both of these two loops exist. In various exemplary embodiments, only one of the two loops is used.

According to the foregoing, in various exemplary embodiments, content in the carousel is sent sequentially sharing the same multicast group address. Likewise, in various exemplary embodiments, content in the carousel is sent sequentially sharing the same basic transmission rate. For example, in various exemplary embodiments, the transmission rate is 100 Kb/s.

In various exemplary embodiments, a set top box joins the multi-cast group if the content in the carousel matches a subscriber's profile and the content does not already exist on a hard disk or other storage media included in that subscriber's set top box.

In various exemplary embodiments, several different carousels exist, each downloading content simultaneously on respective multi-cast addresses. For example, in various exemplary embodiments, different carousels exist and each is associated with a different genre of movies. Thus, in various exemplary embodiments, carousels are assigned to one or more of the following genres: comedy, science-fiction, action, drama, and so on.

Figure 5:
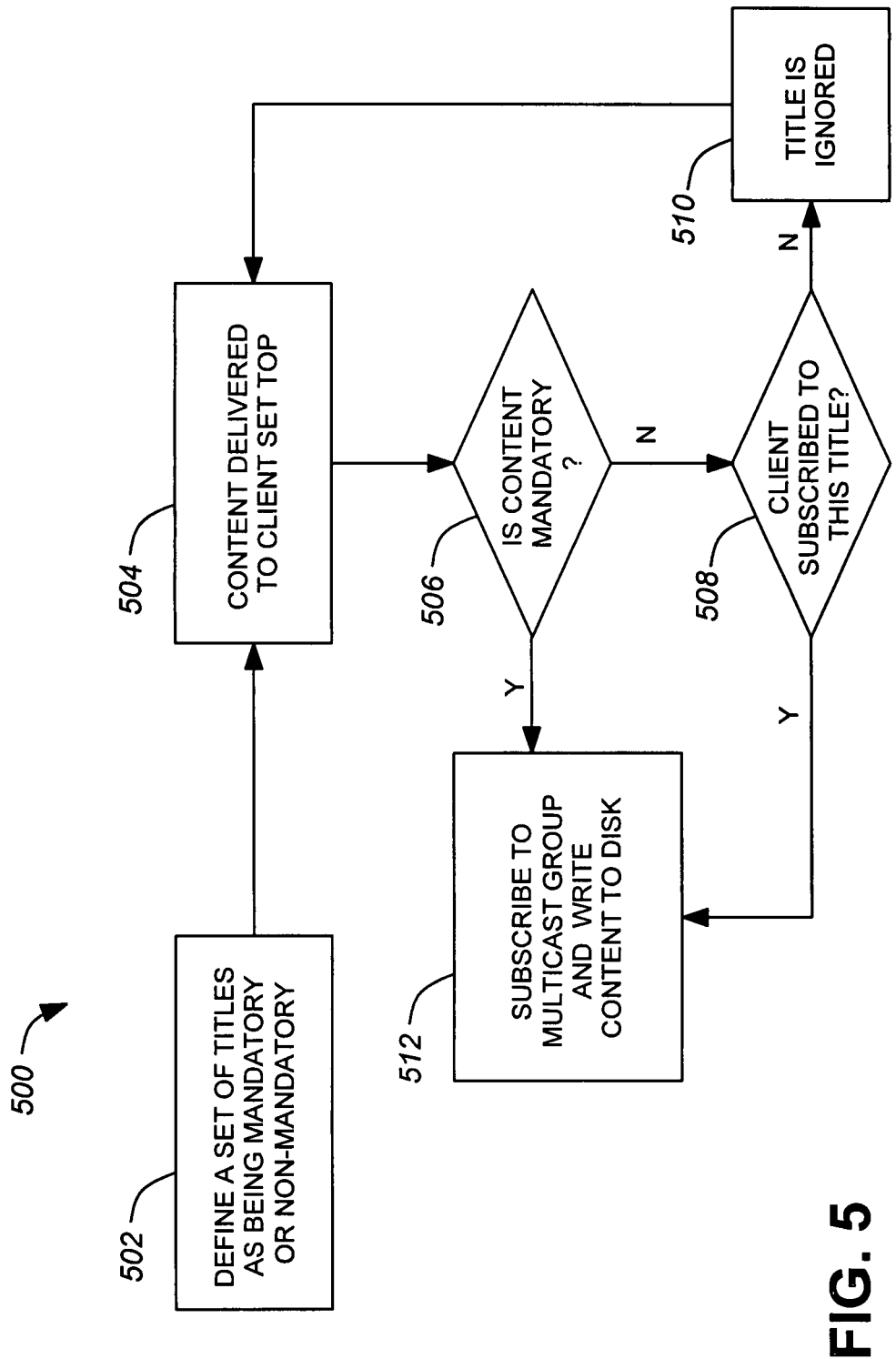
FIG. 5 is a schematic diagram of a third exemplary embodiment of a method of providing video on demand.

FIG. 5 is a schematic diagram of a third exemplary method of providing video on demand 500. Exemplary method 500 begins in step 502 where one or more titles are defined as being either mandatory or non-mandatory. Exemplary method 500 then proceeds to step 504. In exemplary step 504, content is delivered to a client set top. Following delivery of content to the client's set top in step 504, exemplary method 500 proceeds to step 506.

In step 506, an evaluation is performed whether the content is mandatory. If the result of the evaluation performed in step 506 is that the content is not mandatory, the method proceeds to exemplary step 508.

In exemplary step 508 an evaluation is performed whether a client subscribed to the title. If the result of the evaluation performed in step 508 is that a client did not subscribe to the title, then the exemplary method 500 proceeds to exemplary step 510 where the title is ignored. Following exemplary step 510, exemplary method 500 returns to exemplary step 504.

If the result of the evaluation performed in exemplary step 506 is a determination that the content is mandatory, exemplary method 500 proceeds to exemplary step 512. Similarly, if the result of the evaluation performed in exemplary step 508 is that the client subscribed to the title, exemplary method 500 proceeds to exemplary step 512.

In exemplary step 512, the client subscribes to the multicast group. In various exemplary embodiments, the client then writes content to its disk or other storage media. In various exemplary embodiments, the information is sent for a particular channel.

Being able to specify at least a piece of content as being either mandatory or non-mandatory allows a server-based mechanism to force a client to store that piece of content regardless of whether the client has subscribed to the piece of content. In various exemplary embodiments, a mandatory flag is used for any content that must be written to the client set top box. In various exemplary embodiments, the presence of a mandatory flag is determined in step 506. In various exemplary embodiments, when the presence of a mandatory flag is determined in step 506, the presence of the mandatory flag is interpreted to indicate that the content is mandatory.

According to the foregoing, in various exemplary embodiments, content identified as mandatory is popular movies. In another exemplary embodiment, the mandatory information is one or more commercials. For example, in various exemplary embodiments the business model of the entity incorporating the subject matter described herein requires that all subscribers receive one or more commercials. In various exemplary embodiments, the remaining content is offered as subscription content.

In various exemplary embodiments, files are written to storage media such as a disk based on a packet numbering. In other exemplary embodiments, as described herein, files are written to a storage media such as a disk in an order that they arrive and are received.

Figure 6:
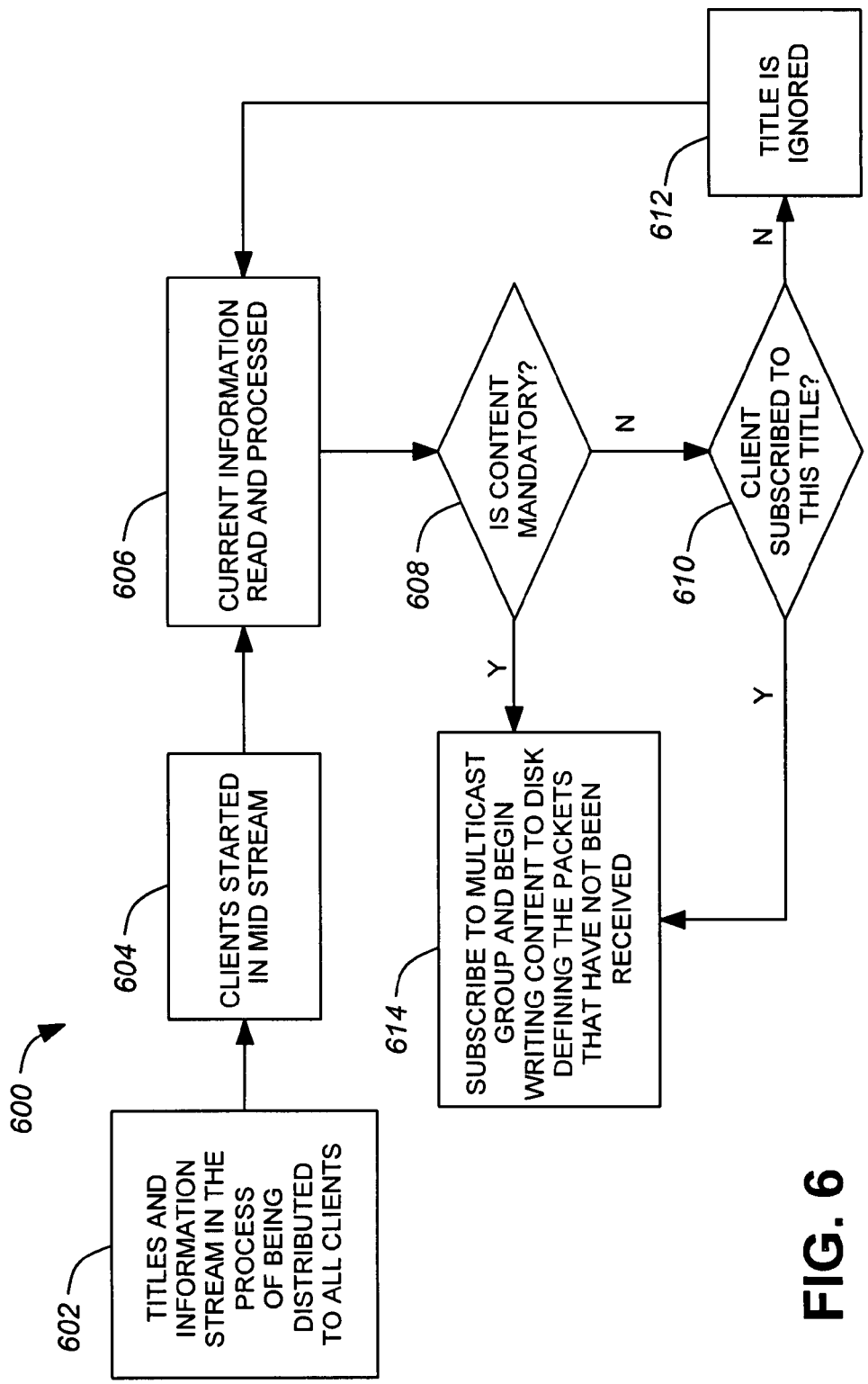
FIG. 6 is a schematic diagram of a fourth exemplary embodiment of a method of providing video on demand.

FIG. 6 is a schematic diagram of a fourth exemplary embodiment of a method of providing video on demand 600. Exemplary method 600 begins in exemplary step 602 where titles and information are distributed to all clients in a stream. Exemplary method 600 then proceeds to exemplary step 604.

In exemplary step 604, the client is started in the middle of the stream. Exemplary method 600 then proceeds to exemplary step 606. In exemplary step 606, all current information is read and processed.

In various exemplary embodiments periodic information on a current channel is sent on an information channel. Thus, in various exemplary embodiments, when the client is started in mid stream in exemplary step 604, the client is informed of the client stream and has the option of joining the current stream in the middle of its transmission.

Following the exemplary step 606, exemplary method 600 proceeds to exemplary step 608 where an evaluation is performed to determine whether content is mandatory. If a determination is made in exemplary step 608 that content is not mandatory, exemplary method 600 proceeds to exemplary step 610. A discussion of the type of content that is mandatory appears above in greater detail in connection with FIG. 5.

In exemplary step 610, a determination is made whether the client subscribed to the title. If a determination is made in step 610 that the client did not subscribe to the title then exemplary method 600 proceeds to exemplary step 612 where the title is ignored. Following exemplary step 612, exemplary method 600 returns to exemplary step 606.

If a determination is made in exemplary step 608 that the content is mandatory, then exemplary method 600 proceeds to exemplary step 614. Similarly, if a determination is made in exemplary step 610 that the client subscribed to the title, exemplary method 600 proceeds to exemplary step 614.

In exemplary step 614 the client subscribes to the multicast group. In various exemplary embodiments, after subscribing to the multicast group, the client begins writing content to its disk. In various exemplary embodiments, after subscribing to the multicast group, the client defines packets that have not yet been received from the stream. In this manner, a client that started in mid-stream is able to receive all of the information included in the stream, in particular if the content is being distributed in a looped or carousel fashion as described above in connection with FIG. 4.

Figure 7:
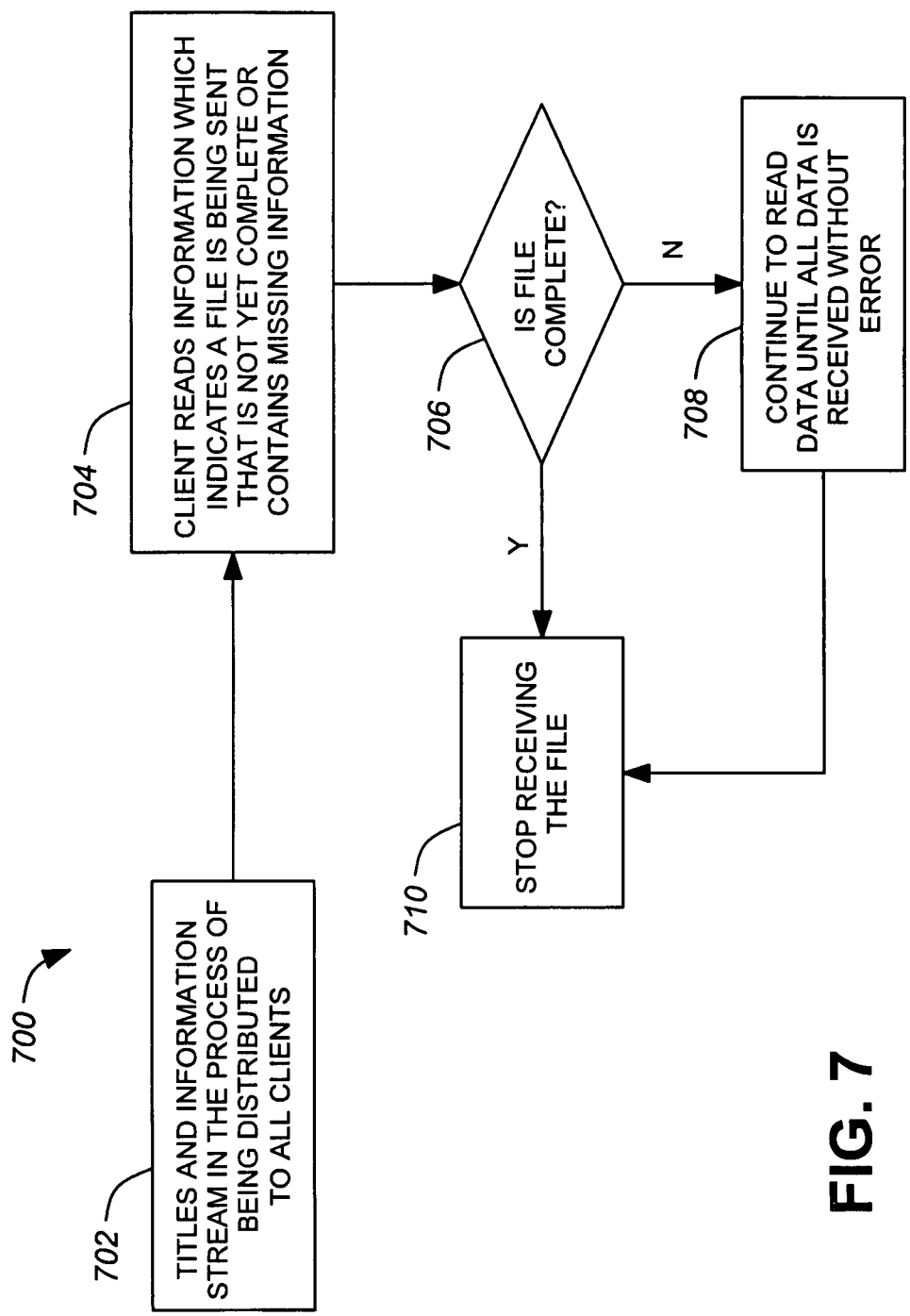
FIG. 7 is a schematic diagram of a fifth exemplary embodiment of a method of providing video on demand.

FIG. 7 is a schematic diagram of a fifth exemplary embodiment of a method of providing video on demand 700. Exemplary method 700 pertains to a method of recovering from a partial file delivery, for example. At the conclusion of step 614 in exemplary method 600 the client that started in mid-stream in exemplary step 604 would have received a partial file delivery. Thus, exemplary method 700 begins with exemplary step 702 which corresponds to exemplary step 602 in exemplary method 600. Following exemplary step 702 exemplary method 700 proceeds to exemplary step 704.

In exemplary step 704, the client reads information indicating that a file is being sent that is not yet complete or contains missing information. Following exemplary step 704 exemplary method 700 proceeds to exemplary step 706. In exemplary step 706, a determination is made whether the file is complete.

If a determination is made is exemplary step 706 that the file is not complete, exemplary method 700 proceeds to exemplary step 708. In exemplary step 708, the client continues to read data until all data in the file is received without error. Once all data in the file is received without error, exemplary method 700 proceeds to exemplary step 710 where the client stops receiving the file. Likewise, if the determination is made in exemplary step 706 that the file is complete, exemplary method 700 proceeds to exemplary step 710 where the client stops receiving the file.

In the foregoing manner, in various exemplary embodiments, the client keeps track of which data it has received and which data it has not received. In various exemplary embodiments, the client identifies a file that has not been completely received. In various exemplary embodiments, the information stream in step 702 indicates that the title is being resent. In various exemplary embodiments, the client re-subscribes to the title until it has received all the data without error from a data stream pertaining to that title. In various exemplary embodiments, the client disconnects from the data stream of that title as soon as a determination is made that the file is complete, even if the stream for that title is otherwise continuing.

According to the foregoing, in various exemplary embodiments, in order to scale the distribution of content, the delivery mechanism is performed via a FEC protected multicast stream or streams. In various exemplary embodiments, FEC protected multicast streams are delivered at a rate completely decoupled from the data transfer rate for the content. In various exemplary embodiments, the FEC protected multicast stream is delivered at a rate according to a network requirement or requirements either faster or slower than the data rate of the content.

In various exemplary embodiments, each packet of data is tagged with a unique sequential identifier. In various exemplary embodiments, the receiver of the content is notified in advance of the characteristics of the content stream being sent. Thus, in various exemplary embodiments, the receiver of the content knows in advance when there are holes in the information being transferred. In various exemplary embodiments, one or more packets of content not included are recovered as described above alternatively, or as a supplement to, the foregoing. In various exemplary embodiments, a unicast mechanism is employed as a mechanism to request lost portions of the data steam.

According to the foregoing, in various exemplary embodiments, data is transferred to a client using a so-called best-effort mechanism. It is believed that a best-effort mechanism may be desirable because mechanisms such as FEC mechanisms may not be able to reconstruct all lost packets in all instances.

According to the foregoing, in various exemplary embodiments, the load on the network is reduced. Thus, various exemplary embodiments result in cost savings. Various exemplary embodiments improve the number of end points. Various exemplary embodiments are efficient for distributing content to VoD servers in a network. Likewise, various exemplary embodiments are effective mechanisms to reduce bandwidth requirements for delivering popular content to clients.

According to the foregoing, in various exemplary embodiments including IPTV client devices with hard disks installed, popular movies are stored on the hard disks. In various exemplary embodiments, when a user elects to play a movie, the client first checks to see if the movie title is available on a local hard disk. In various exemplary embodiments, when a movie title is available on a local hard disk the desired title is played directly from the hard disk instead of by streaming the title through the network.

In various exemplary embodiments, the application and system look ahead into the client buffer and determine what packets are missing. In various exemplary embodiments, only the missing packets are requested from the VoD server in the network. Various exemplary embodiments use a trickle down mechanism to pre-cache the starts of movies such as introductory studio content included at the beginning of a movie title. Thus, in various exemplary embodiments, a VoD title is able to start instantly and pre-fill the buffer on the set top box.

Although the various exemplary embodiments have been described in detail with particular reference to certain exemplary aspects thereof, it should be understood that other embodiments exist including combinations of various aspects described in connection with different embodiments or figures, and the details are capable of modifications in various obvious respects. As is readily apparent to those skilled in the art, variations and modifications can be affected while remaining within the spirit and scope of the disclosure. Accordingly, the foregoing disclosure, description, and figures are for illustrative purposes only, and do not in any way limit the invention, which is defined only by the claims.

What is claimed is:

1. A method of delivering data in at least first and second categories of service from a Video-on-Demand (VoD) system to a client device, the method comprising:
beginning delivery of content from the VoD system to the client device, wherein the client device automatically receives content from the first category of service identified by a flag but must have subscriptions to receive specified content from the second category of service;
starting a client device to receive the content from a data stream at an initial delivery location between a start point and an end point of the data stream;
reading and processing the received content from the initial delivery location to the end point of the data stream;
evaluating whether the content is complete;
determining that the content is not complete;
reading additional content from the data stream;
identifying the content from the start point to the initial delivery location in the data stream;
receiving the content from the start point to the initial delivery location; and
determining that the content is complete.

2. The method of delivering data as claimed in claim 1, further comprising:
repeating the steps of beginning, starting, reading and processing, evaluating, determining that the content is not complete, reading, identifying, receiving, and determining that the content is complete, for additional content.

3. The method of delivering data as claimed in claim 1, further comprising:
identifying information missing from the content and supplying the missing information.

4. The method of delivering data as claimed in claim 1, wherein the content is video on demand content.

5. The method of delivering data as claimed in claim 4, wherein the video on demand content includes a schedule of a plurality of titles.

6. The method of delivering data as claimed in claim 1, wherein the client device monitors the content in the data stream for an event that requires action, the client device identifies the event requiring action, and the client device performs the required action.

7. The method of delivering data as claimed in claim 6, wherein the required action includes downloading a new video on demand title.

8. The method of delivering data as claimed in claim 7, wherein the required action further includes:
deleting an old video on demand title from storage media included with the client device.

9. The method of delivering data as claimed in claim 7, wherein the new video on demand title has a future release date, and access to the new video on demand title is unavailable until the future release date.

10. The method of delivering data as claimed in claim 6, wherein identifying the event requiring action includes determining that the client device has subscribed to a new video on demand title.

11. The method of delivering data as claimed in claim 6, wherein the required action includes redefining a delivery parameter.

12. The method of delivering data as claimed in claim 11, wherein the delivery parameter is a rate at which video on demand data is transferred.

13. The method of delivering data as claimed in claim 1, further comprising:
storing the content on storage media included with the client device.

14. A method of delivering data in at least first and second categories of service, comprising:
defining data sent to a plurality of client devices corresponding to the first category of service as mandatory data based upon a flag;
defining additional data corresponding to the second category of service as optional data, wherein clients automatically receive content from the first category of service but must have subscriptions to receive specified content from the second category of service;
subscribing the plurality of client devices to a multicast group corresponding to the mandatory data based upon the flag;
transmitting the mandatory data from a data source to a network;
relaying the mandatory data from the network to an access node;
replicating the mandatory data at the access node; and
sending the replicated mandatory data from the access node to the plurality of client devices, the plurality of client devices corresponding to a plurality of users that have not asked to receive the mandatory data.

15. The method of delivering data as claimed in claim 14, further comprising:
subscribing the plurality of client devices to a multicast group corresponding to the optional data;
transmitting the optional data from the data source to the network;
relaying the optional data from the network to the access node;
replicating the optional data at the access node; and
sending the replicated optional data from the access node to the plurality of client devices, the plurality of client devices corresponding to a plurality of users that want to receive the optional data.

16. The method of delivering data as claimed in claim 15, wherein the optional data is less popular content than the mandatory data.

17. The method of delivering data as claimed in claim 14, wherein each of the plurality of client devices waits a random amount of time between the steps of defining data as mandatory data and involuntarily subscribing the plurality of client devices to the multicast group corresponding to the mandatory data.

18. The method of delivering data as claimed in claim 14, wherein the data is video on demand content.

19. A method of delivering data in at least first and second categories of service, comprising:
establishing in a data source a carousel containing a plurality of data sets, wherein clients automatically receive data sets from the first category of service but must have subscriptions to receive data sets from the second category of service;
transmitting a first data set of the plurality of data sets from the data source to a network;
relaying the first data set from the network to an access node;
replicating the first data set at the access node;
sending the replicated first data set from the access node to a plurality of client devices;

repeating the steps of transmitting, relaying, replicating and sending for at least a second data set of the plurality of data sets; and cycling back to the step of transmitting a first data set after completing the step of repeating for as least a second data set.

20. The method of delivering data as claimed in claim 19, further comprising:

defining delivering a delivery parameter for the carousel.

21. The method of delivering data as claimed in claim 20, further comprising:

evaluating whether a change of the delivery parameter is desirable;

determining that a change of the delivery parameter is desirable; and redefining the delivery parameter.

22. The method of delivering data as claimed in claim 19, further comprising:

evaluating whether a change in one or more of the plurality of data sets is desirable;

determining that a change in one or more of the plurality of data sets is desirable; and changing the one or more of the plurality of data sets for which the determination is made that a change is desirable.

23. The method of delivering data as claimed in claim 19, wherein the plurality of data sets are video on demand content.

* * * * *